US006982957B2

(12) United States Patent
Kiiski et al.

(10) Patent No.: US 6,982,957 B2
(45) Date of Patent: Jan. 3, 2006

(54) PACKET TRANSMISSION METHOD AND APPARATUS

(75) Inventors: Matti Kiiski, Oulunsalo (FI); Eero Heikkinen, Oulu (FI)

(73) Assignee: Nokia Corporation, Espoo (FI)

( * ) Notice: Subject to any disclaimer, the term of this patent is extended or adjusted under 35 U.S.C. 154(b) by 855 days.

(21) Appl. No.: 09/888,660

(22) Filed: Jun. 25, 2001

(65) Prior Publication Data

US 2002/0126664 A1 Sep. 12, 2002

Related U.S. Application Data

(63) Continuation of application No. PCT/EP98/08512, filed on Dec. 30, 1998.

(51) Int. Cl.
*H04J 1/16* (2006.01)

(52) U.S. Cl. ............... 370/235; 370/310.1; 370/395.21

(58) Field of Classification Search ................ 370/252, 370/474, 310.1, 229–231, 328, 338, 401, 370/235, 395.1, 395.21

See application file for complete search history.

(56) References Cited

U.S. PATENT DOCUMENTS

| | | | | |
|---|---|---|---|---|
| 5,267,232 | A * | 11/1993 | Katsube et al. | 370/230 |
| 6,072,773 | A * | 6/2000 | Fichou et al. | 370/230 |
| 6,151,314 | A * | 11/2000 | Rauhala | 370/350 |
| 6,230,297 | B1 * | 5/2001 | Bentall et al. | 714/758 |
| 6,233,222 | B1 * | 5/2001 | Wallentin | 370/229 |
| 6,480,467 | B1 * | 11/2002 | Hernandez-Valencia | 370/230 |
| 6,762,996 | B1 * | 7/2004 | Petit | 370/230 |

FOREIGN PATENT DOCUMENTS

| | | | |
|---|---|---|---|
| EP | 0275679 | A1 | 7/1988 |
| EP | 0851706 | A1 | 7/1998 |
| GB | 2313748 | A | 12/1997 |
| WO | WO 98/08351 | | 2/1998 |

OTHER PUBLICATIONS

Sheu et al., A cell discarding strategy to reduce cell error rate in wireless ATM networks, May 25-28, 1997, IEEE ATM Workshop 1997 Proceedings, pp. 401-409.*

* cited by examiner

*Primary Examiner*—Ricky Ngo
*Assistant Examiner*—Nittaya Juntima
(74) *Attorney, Agent, or Firm*—Squire, Sanders & Dempsey L.L.P.

(57) ABSTRACT

A packet transmission method and apparatus for transmitting data packets via a telecommunication network are described, wherein the quality of a received data packet is judged and the data packet is tagged in response to the result of the quality judgment. The tagging is performed by adding a dropping information, wherein a tagged cell is dropped on the basis of the dropping information and a predetermined dropping condition such as a transmission congestion situation and/or an overuse of a contract of a particular connection. In the uplink direction, the quality judgment can be based on an error check or a comparison of a quality base likelihood parameter with a threshold value. In the downlink direction, the quality judgment can be performed on the basis of an uplink quality parameter and/or a downlink power control status. Accordingly, in case of a congestion and/or an overuse of a particular connection, low quality transmission packets are dropped first to thereby reduce traffic.

30 Claims, 3 Drawing Sheets

PACKET TRANSMISSION METHOD AND APPARATUS

This application is a continuation of international application serial number PCT/EP98/08512, filed 30 Dec. 1998.

FIELD OF THE INVENTION

The present invention relates to a packet transmission method and apparatus for transmitting data packets such as ATM (Asynchronous Transfer Mode) cells via a telecommunication network such as a mobile network.

BACKGROUND OF THE INVENTION

Increasingly, mobile phone users will want to use wireless access not only for voice communications, but for applications such as accessing a corporate LAN (Local Area Network), using the Internet or an intranet, video conferencing and sending and retrieving high-quality pictures. Wide Band Code Division Multiple Access (WCDMA) represents an excellent air-interface technology to meet these future requirements of wireless communication services with data rates up to 2 Mbps.

WCDMA meets the UMTS (Universal Mobile Telecommunications System) requirements. Packet and circuit-switched services can be freely mixed, with variable band widths, and delivered simultaneously to the same user, with specific quality levels. Bandwidth requirements for users can be changed during a session. This is achieved in a spectrum-efficient WCDMA wireless access network that can be deployed cost-effectively by adding it onto an existing wireless network such as a GSM (Global System for Mobile communications) network.

In such a WCDMA system or an equivalent system, a Macro Diversity Combining (MDC) is usually implemented at a radio network controller (RNC). The RNC is used to connect to base stations (BS) of the GSM network by terrestrial links. Such terrestrial links are usually implemented using the ATM as the transport protocol. ATM is a layered architecture allowing multiple services like voice, data and video, to be mixed over the network. Three lower level layers have been defined to implement the features of ATM. An adaptation layer assures the appropriate service characteristics and divides all types of data into a 48 byte payload that will make up an ATM cell. Furthermore, an ATM layer takes the data to be sent and adds a 5 byte header information that assures that the ATM cell is sent on the right connection. Finally, a physical layer defines the electrical characteristics and network interfaces, wherein ATM is not tight to a specific type of physical transport. Since ATM is not based on a specific type of physical transport, it is compatible with currently deployed physical networks.

In the WCDMA system, each branch of MDC is carrying the same stream of bits from/to a mobile station (MS), wherein a BS receiver marks the quality of each received frame in a baseband channel-decoding unit. Marking could tell the amount of unrecoverable bits, whether the frame is correct or not, or other kinds of estimation of the frame quality. According to a specification of the Japanese standardization body ARIB, the marking of the frames in a 3G mobile system is proposed to be based on a cyclic redundancy code (CRC) check result and on a Eb/N0 (energy per bit to noise power density ratio) based likelyhood parameter. In MDC, the best one of the MDC branches is selected by the RNC, or the received frames of all MDC branches are combined, to obtain a single uplink data stream.

Furthermore, ATM and transport protocols of the Internet Protocol (IP) include a multicast feature. This feature allows the transfer of only one data stream over a transmission link if there are multiple users receiving exactly the same bit stream. The division into individual streams is performed at the latest possible network node.

However, MDC leads to increased traffic in the transmission links, due to the fact that the same data stream is transmitted over a plurality of MDC branches. This increased traffic may result in transmission congestion situations or in an increased transmission overhead.

SUMMARY OF THE INVENTION

It is therefore an object of the present invention to provide a packet transmission method and apparatus capable of reducing traffic in a transmission link.

This object is achieved by a packet transmission method for transmitting data packets via a telecommunication network, comprising the steps of:

judging quality of a received data packet;

tagging said data packet by adding a dropping information in accordance with the result of said judging step; and dropping said tacked data packet based on said added dropping information, when a predetermined dropping condition is met.

Furthermore, the above object is achieved by a packet transmission apparatus for transmitting data packets via a telecommunication network, comprising:

judging means for judging the quality of a received data packet; and tagging means for adding a dropping information to said data packet in response to a judging result of said judging means.

Accordingly, low quality data packets which do not need to be transmitted can be tagged by the dropping information in order to be dropped, when the predetermined dropping condition is met. The predetermined dropping condition may be a congestion of the transmission link. Thereby, the traffic can be reduced in a congestion situation, since unnecessary data packets are dropped.

Moreover, transmission overhead can be reduced in macro diversity cases such as a soft handover, since low quality data packets which will not be selected in the combining procedure are dropped from the data stream.

In addition thereto, the dropping information may be used for tagging cells of a particular connection which happens to overuse its contract. Thus, an additional or alternative predetermined dropping condition may be an overuse of the contract of a particular connection.

Preferably, the dropping information may be a drop flag provided in a header portion of the data packet. Thereby, a data packet can be tagged merely by setting the drop flag of its header portion.

The quality judgment may be performed on the basis of an error check of the data packet. Such an error check may be performed on the basis of a cyclic redundancy code included in the received data packet.

Additionally, the quality judgment may be performed on the basis of a comparison of a quality likelyhood parameter with a predetermined threshold. In this case, the predetermined threshold may be periodically updated for each transmission link of the telecommunication network. Thus, individual quality requirements of specific transmission links can be taken into account.

The dropping may be executed at a network element where traffic policing or congestion control is implemented.

Thereby, existing network elements can be used for dropping data packets, such that only minor modifications of the network are required.

Furthermore, the packet transmission method may be an ATM transmission method, wherein the data packet is an ATM cell. In this case, defective data frames may be packed into the same ATM cell, wherein those ATM cells which contain only defective frames are tagged in said tagging step. Preferably, the telecommunication network may be a mobile communication network, wherein the transmission method is used for transmitting ATM cells between a base station and a radio network controller.

The data packet may comprise a macro diversity combining bit stream.

In case the telecommunication network is a mobile communication network and the data packet is a downlink data packet, the quality of the downlink data packet may be judged on the basis of an uplink quality parameter and/or a downlink power control status. In this case, a downlink power level is commanded by a mobile station to which the data packet is to be transmitted, and the predetermined dropping condition is a congestion of a transmission link between a radio network controller and a base station. Preferably, the transmission link is a macro diversity branch.

The packet transmission apparatus may comprise a dropping means for detecting the dropping information and for dropping the data packet based on the detected dropping information, when the predetermined dropping condition is met.

Alternatively, a network element may be provided in the telecommunication network, comprising dropping means for detecting the dropping information included in a received data packet, and for dropping the data packet based on the detected dropping information, when the predetermined dropping condition is met.

Preferably, the dropping means comprises a drop control means for determining a congestion of a transmission link and/or an overuse of a contract of the transmission link, as said predetermined dropping condition, and for releasing a dropping operation, when the predetermined dropping condition has been determined.

The tagging means may be arranged to set a drop flag provided in a header portion of the data packet.

Furthermore, the judging means may be arranged to judge the quality of the received data packet based on an error check of the received data packet. The error check may be performed based on a cyclic redundancy code included in the received data packet. Alternatively, the judging means may be arranged to judge the quality on the basis of a comparison of a quality likelihood parameter with a stored predetermined threshold. In this case, the stored predetermined threshold may be periodically received and updated by the judging means.

The dropping means may be a means for traffic policing and congestion control.

In case the telecommunication network is a mobile network, the packet transmission apparatus may be a base station or a radio network controller.

In case the packet transmission apparatus is arranged to perform a down link transmission, the judging means may be arranged to judge the quality of the received data packet based on an uplink quality parameter and/or a downlink power control status. In a mobile network, such a packet transmission apparatus may be a radio network controller.

The network element in which the dropping means is provided may be an ATM node or an ATM gateway, wherein the received data packet is an ATM cell.

BRIEF DESCRIPTION OF THE DRAWINGS

In the following, the present invention will be described in greater detail on the basis of a preferred embodiment with reference to the accompanying drawings in which.

DESCRIPTION OF THE PREFERRED EMBODIMENT

In the following, the preferred embodiment of the packet transmission method and apparatus according to the present invention will be described on the basis of a radio access network of a WCDMA system such as the UMTS.

Figure 1:
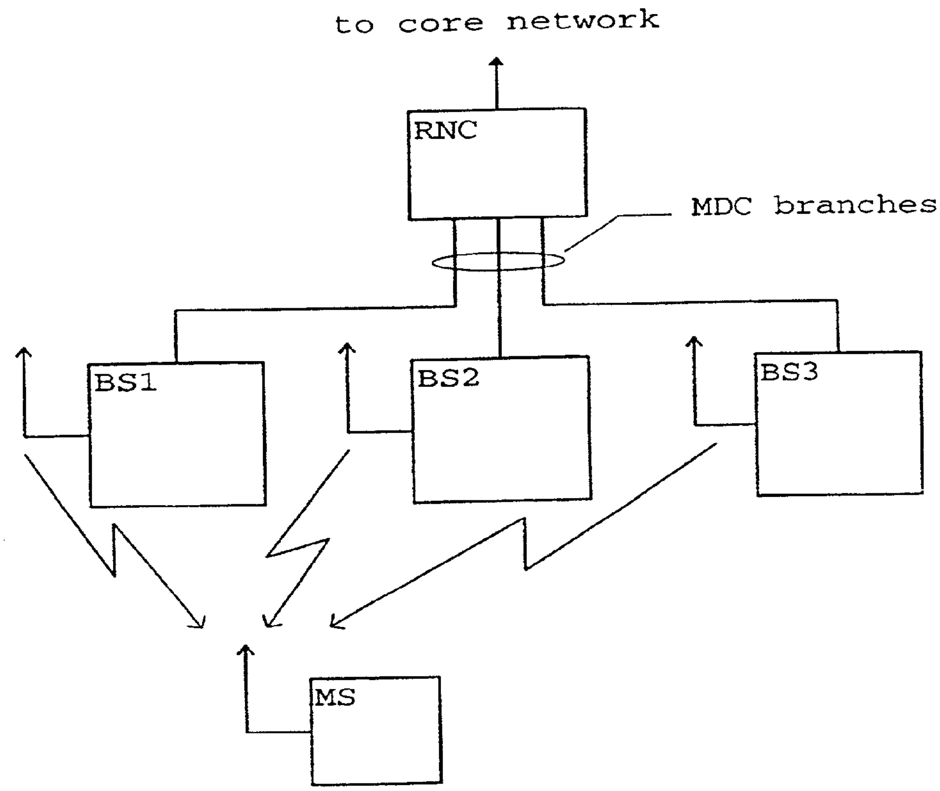
FIG. 1 shows a principle block diagram of a radio access network of a mobile communication system, wherein a radio network controller provides a connection to a mobile station via a plurality of MDC branches.

FIG. 1 shows such a radio access network, wherein a mobile station MS is radio-connected to three base stations BS1, BS2 and BS3 which are connected to a radio network controller (RNC). In the present WCDMA based system, the mobile station MS is simultaneously connected to the three base stations BS1, BS2 and BS3 transmitting identical data streams to thereby achieve a macro diversity function. In such a macro diversity function, the best MDC branch or a combination of the MDC branches is used for the actual communication.

According to the preferred embodiment, the terrestrial links between the base stations BS1, BS2 and BS3 and the radio network controller RNC are ATM connections for transmitting ATM cells.

Figure 2:
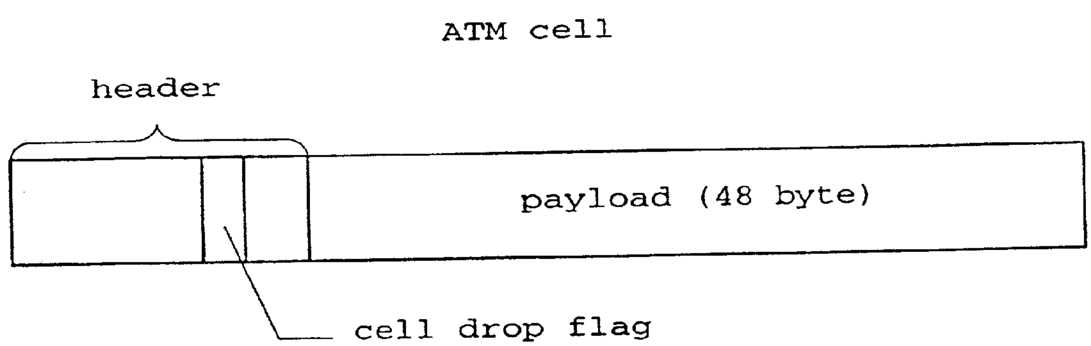
FIG. 2 shows a structure of an ATM cell according to the preferred embodiment of the present invention.

FIG. 2 shows the principle structure of such an ATM cell. According to FIG. 2, the ATM cell comprises a header portion which may consist of 5 bytes or the like, and an information or payload portion consisting of 48 bytes. The 48 payload bytes consist of a plurality of radio frames received by the respective base station from the mobile station MS.

According to the preferred embodiment, a cell drop flag is included in the header portion of the ATM cell, which may consist of 1 bit and which is used to tag a cell for dropping. The cell dropping is based on a predetermined dropping condition. In the present embodiment, the dropping condition is based on a congestion situation or an overuse of a contract of a particular connection. However, any other condition suitable for dropping of a low quality ATM cell may be applied.

Figure 3:
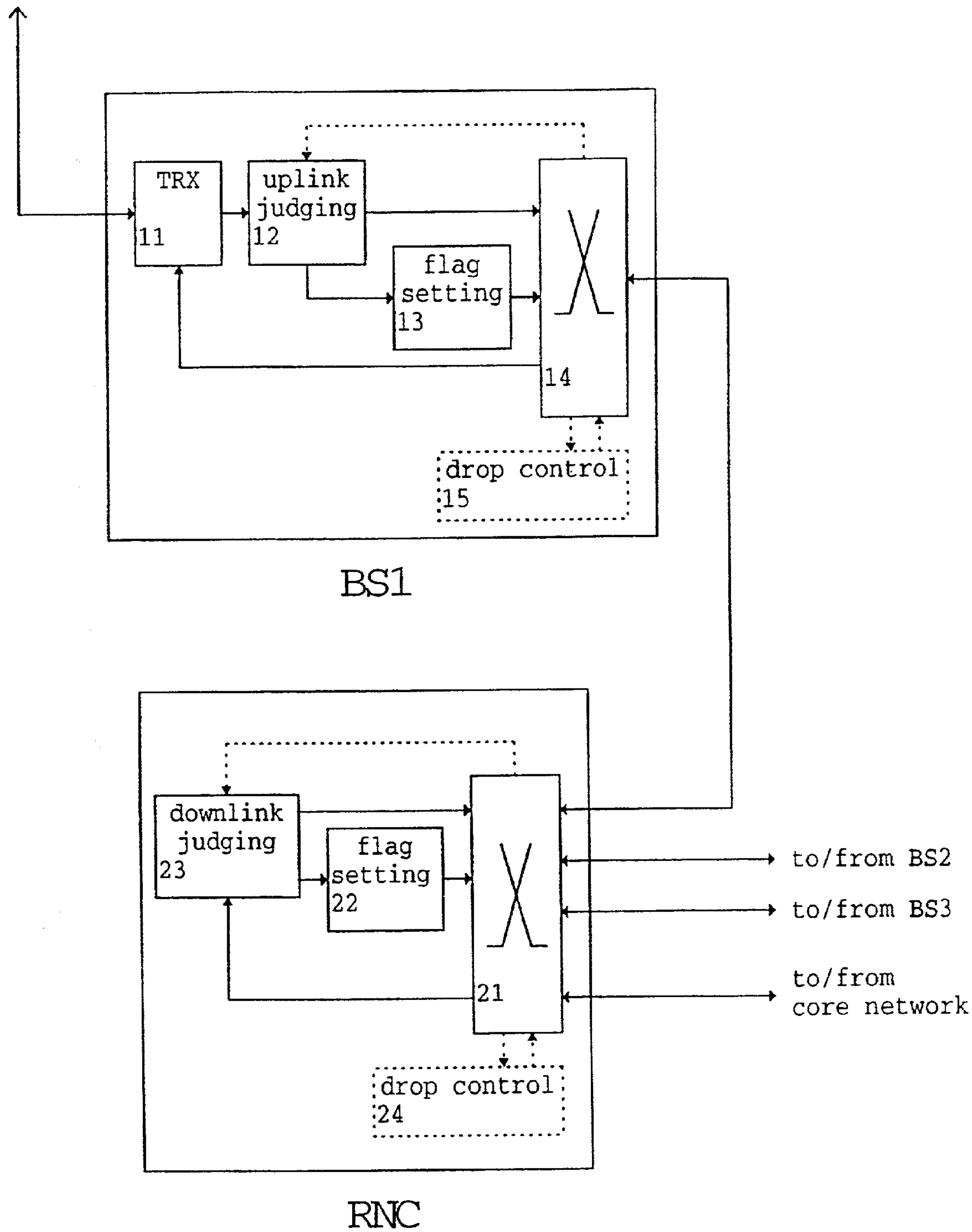
FIG. 3 shows a base station and a radio network controller according to the preferred embodiment of the present invention.

FIG. 3 shows a principle block diagram of the base station BS1 and the radio network controller RNC. According to FIG. 3, the base station BS1 comprises an ATM switch 14 by means of which the base station BS1 is connected via an ATM link to an ATM switch 21 of the radio network controller RNC. Moreover, the ATM switch 21 of the radio network controller RNC is connected to ATM transmission links to/from the other base stations BS2 and BS3 and a core network such as a GSM or UMTS network.

It is to be noted that the ATM switch 14 of the base station BS1 includes a cell generating function, i.e. packing of received data frames and adding of the header portion of the ATM cell is performed in the ATM switch 14.

In the following, the operation of the preferred embodiment is described on the basis of the flow diagrams depicted in FIGS. 4A, 4B and 5.

Figure 4A:
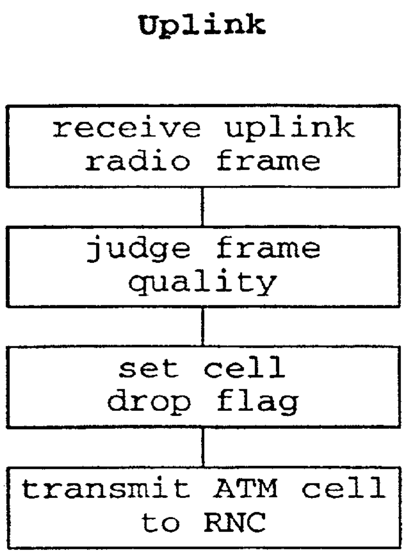
FIGS. 4A and 4B show flow diagrams of packet transmission methods in an uplink and downlink direction, respectively, according to the preferred embodiment of the present invention.

FIG. 4A shows a principle flow diagram of the packet transmission method according to the preferred embodiment in an uplink direction from the base station BS1 to the radio network controller RNC. Initially, the base station BS1 receives an uplink radio frame from the mobile station MS via a transceiver (TRX) 11. Thereafter, the received frame is supplied to an uplink judging means 12 for judging the quality of the received uplink frame. Then, the received uplink frame is supplied to the ATM switch 14 in order to be packed into a ATM cell and transmitted to the radio network controller RNC.

The judging in the uplink judging means 12 can be performed on the basis of an error check of the received frame. According to the ARIB specifications, defective frames are determined by checking a cyclic redundancy code included in the received frames. However, any other error check could be performed in the uplink judging means 12.

Moreover, the judging could be improved by defining a threshold value and using a quality based likelihood parameter such as an Eb/N0 based likelihood parameter. In this case, the threshold value is stored in the uplink judging means 12 or another part of the base station BS1 in order to be compared with the likelihood parameter in the uplink judging means 12. The threshold value could be defined and updated periodically by the radio network controller RNC for every transmission link controlled by the radio network controller RNC, and may be supplied to the uplink judging means 12 via the ATM switch 14 (cf. dotted line in FIG. 3).

Alternatively, the judgment of the uplink judging means 12 could be based on a combination of the error check and the comparison of the quality likelihood parameter.

Based on the result of the quality judgment, the uplink judging means 12 supplies a flag setting command to a flag setting means 13 which controls the ATM switch 14 to generate a cell drop flag in the header portion of the ATM cell in accordance with the result of the quality judgment. Thereby, ATM cells carrying user data frames of low quality, i.e. defective frames or frames which quality based likelihood parameters are below the predetermined threshold value, are tagged by the cell drop flag.

If the AAL2 (ATM Adaptation Layer level 2) protocol is used, defective frames could be packed by the ATM switch 14 into the same ATM cell, wherein non-defective frames are also packed together in respective ATM cells. In this case, the flag setting means 13 is arranged to control the ATM switch 14 in such a way that only those ATM cells are tagged by the cell drop flag, which only contain defective frames in their payload portion.

Figure 4B:
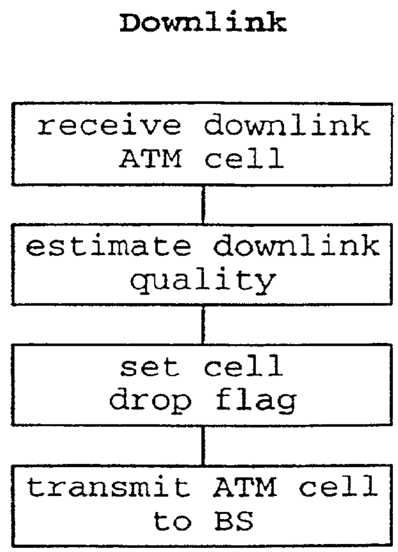

FIG. 4B shows a flow diagram of the packet transmission method according to the present invention in case of a downlink transmission from the radio network controller RNC to the base station BS1. According to FIG. 4B, a downlink ATM cell is received by the ATM switch 21 from the core network and is supplied to a downlink judging means 23. The downlink judging means 23 is provided for judging an estimated quality of the upcoming downlink transmission of the received ATM cell. Based on the estimated downlink quality, an information is supplied to a flag setting means 22 which is arranged to control the ATM switch 21 so as to correspondingly set the cell drop flag provided in the header portion of the received ATM cell before transmitting it to the ATM switch 14 of the base station BS1.

In the present case, the estimated quality of the downlink transmission may be judged on the basis of a received uplink quality parameter and/or a downlink power control status, wherein the corresponding information may be supplied from the ATM switch 21 to the downlink judging means 23 (cf. dotted line in FIG. 3). The uplink quality parameter may be obtained on the basis of an error check performed in the base station BS1 and transmitted to the radio network controller RNC. The downlink power control status may be obtained from a downlink power level commanded by the mobile station, such that weaker links which provide only little contribution to the total quality of an MDC transmission can be identified. Thus, ATM cells of such weaker links can be tagged by setting their respective cell drop flags. Thus, in case of downlink cell tagging, the radio network controller RNC estimates the weakest BS to MS links and tags the ATM cells which carry these frames accordingly.

Figure 5:
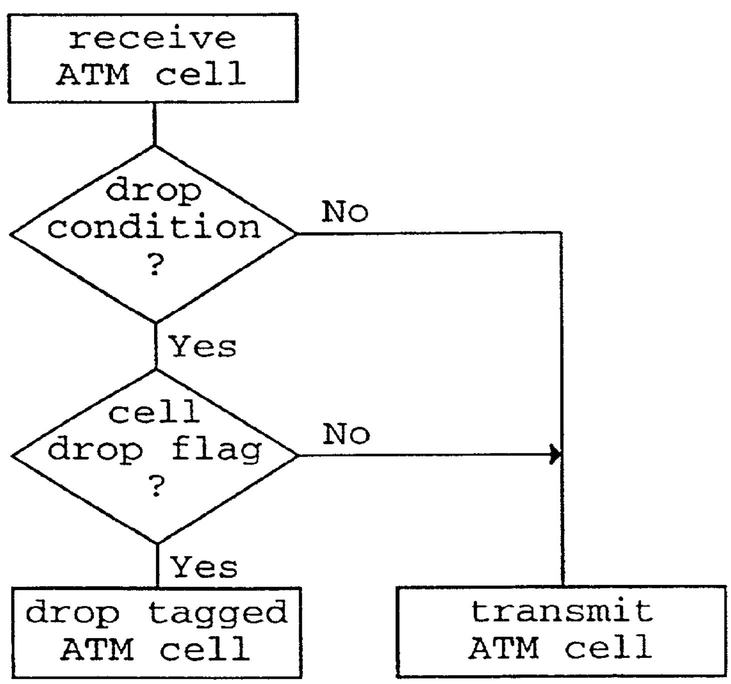
FIG. 5 shows a flow diagram of a cell dropping operation according to the preferred embodiment of the present invention.

FIG. 5 shows a flow diagram of the dropping operation, which may be performed at an ATM node or an ATM gateway or any other network element. The dropping operation of uplink ATM cells may be directly performed in the base station BS1 and the dropping operation of downlink ATM cells in the radio network controller RNC. According to FIG. 3, optional drop control units 15 and 24 are shown which are arranged to control the respective ATM switches 14 and 21 of the base station BS1 and the radio network controller RNC, respectively.

According to the preferred embodiment, the dropping operation is performed in the ATM switches 14 and 21 based on a control information supplied by the respective drop control unit 15 or 24.

The following description of the dropping operation relates to the uplink transmission as well as the downlink transmission. According to FIG. 5, a drop condition is checked by the respective drop control unit 15 or 24 based on an information supplied from the respective ATM switch 14 or 21 after an ATM cell has been received. The drop condition may be a transmission congestion situation and/or an overuse of the contract of a particular connection. The corresponding information may be obtained by the respective ATM switch 14 or 21 from corresponding signaling parameters.

In case the drop control unit 15 or 24 does not determine any drop condition, the ATM cell is transmitted as usual. In case a drop condition is determined by the drop control unit 14 or 24 on the basis of the information supplied from the respective ATM switch 14 or 21, the drop control unit 15 or 24 performs a check as to whether the drop control flag has been set by the respective flag setting means 13 or 22. If the cell drop flag is not set, the ATM cell is transmitted as usual. Otherwise, if the cell drop flag has been set, the drop control unit 15 or 24 controls the respective ATM switch 14 or 21 so as to drop the tagged ATM cell.

In case the dropping operation is performed in a separate network element, a similar drop control unit and ATM switch or other dropping means is provided in the network element.

Accordingly, in case of a congestion situation, the traffic of the ATM transmission line can be reduced, by dropping low quality or unnecessary ATM cells. Furthermore, ATM cells of a particular connection which has overused its contract can be dropped as well.

However, the packet transmission method and apparatus are not restricted to an ATM transmission The cell drop flag may be included in any frame or data packet type. Generally, the dropping operation can be executed at any point where traffic policing and/or congestion control is implemented.

It is to be pointed out that the packet transmission method and apparatus described in the preferred embodiment can be applied to any telecommunication network in which data packets are transmitted. Moreover, any kind of dropping information can be added or incorporated into the data packet. Regarding the block diagram shown in FIG. 3, it is to be noded, that the judging, flag setting and drop control functions may either be implemented as individual hardware components or as program routines used for controlling a respective control unit or CPU provided in the base station BS1, the radio network controller RNC or the respective network element.

The above description of the preferred embodiment and the accompanying drawings are only intended to illustrate the present invention. The preferred embodiment of the invention may thus vary within the scope of the attached claims.

In summary, packet transmission method and apparatus for transmitting data packets via a telecommunication network are described, wherein the quality of a received data packet is judged and the data packet is tagged in response to the result of the quality judgment. The tagging is performed by adding a dropping information, wherein a tagged cell is dropped on the basis of the dropping information and a predetermined dropping condition such as a transmission congestion situation and/or an overuse of a contract of a particular connection. In the uplink direction, the quality judgment can be based on an error check or a comparison of a quality base likelihood parameter with a threshold value. In the downlink direction, the quality judgment can be performed on the basis of an uplink quality parameter and/or a downlink power control status. Accordingly, in case of a congestion and/or an overuse of a particular connection, low quality transmission packets are dropped first to thereby reduce traffic.

What is claimed is:

1. A packet transmission method for transmitting data packets via a telecommunication network, comprising the steps of:

a) judging a quality of a received data packet;

b) tagging said data packet by adding dropping information in response to the result of said judging step; and c) dropping said tagged data packet based on said added dropping information, when a predetermined dropping condition is met, wherein said quality is judged on the basis of an uplink quality parameter and/or a downlink power control status, wherein said data packet is an ATM cell and defective data frames are packed into the same ATM cell, and wherein those ATM cells which contain only defective frames are tagged in said tagging step.

2. A method according to claim 1, wherein said dropping information is a drop flag provided in a header portion of said data packet.

3. A method according to claim 1, wherein said quality judgment is performed on the basis of an error check of said data packet.

4. A method according to claim 3, wherein said error check is performed based on a cyclic redundancy code included in said received data packet.

5. A method according to claim 1, wherein said quality judgment is performed on the basis of a comparison of a quality likelihood parameter with a predetermined threshold.

6. A method according to claim 5, wherein said predetermined threshold is periodically updated for each transmission link of said telecommunication network.

7. A method according to claim 1, wherein said dropping step is executed at a network element where traffic policing and/or congestion control is implemented.

8. A method according to claim 1, wherein said predetermined dropping condition is a congestion of a transmission link.

9. A method according to claim 1, wherein said predetermined dropping condition is an overuse of a contract of a particular connection.

10. A method according to claim 1, wherein said packet transmission method is an ATM transmission method.

11. A method according to claim 10, wherein said telecommunication network is a mobile communication network, and wherein said transmission method is used for transmitting ATM cells between a base station and a radio network controller.

12. A method according to claim 1, wherein said data packet comprises a macro diversity combining bit stream.

13. A method according to claim 1, wherein said telecommunication network is a mobile communication network and said data packet is a downlink data packet.

14. A method according to claim 13, wherein said downlink power control status is determined on the basis of a downlink power level commanded by a mobile station to which said data packet is to be transmitted.

15. A method according to claim 14, wherein said transmission link is a macro diversity branch.

16. A transmission apparatus for transmitting data packets via a telecommunication network, comprising:

a) judging means for judging a quality of a received data packet; and b) tagging means for adding dropping information to said data packet in response to a judging result of said judging means, wherein said judging means is arranged to judge the quality of said received data packet based on an uplink quality parameter and/or a downlink power control status, wherein said data packet is an ATM cell and defective data frames are packed into the same ATM cell, and wherein those ATM cells which contain only defective frames are tagged in said tagging means.

17. An apparatus according to claim 16, wherein said packet transmission apparatus comprises a dropping means for detecting said dropping information and for dropping said data packet based on said detected dropping information, when a predetermined dropping condition is met.

18. An apparatus according to claim 16, wherein said tagging means is arranged to set a drop flag provided in a header portion of said data packet.

19. An apparatus according to claim 16, wherein said packet transmission apparatus is arranged to perform an uplink transmission, and wherein said judging means is arranged to judge the quality of said received data packet based on an error check of said received data packet.

20. An apparatus according to claim 19, wherein said judging means is arranged to perform said error check based on a cyclic redundancy code included in said received data packet.

21. An apparatus according to claim 16, wherein said judging means is arranged to judge the quality on the basis of a comparison of quality likelihood parameter with a stored predetermined threshold.

22. An apparatus according to claim 21, wherein said stored predetermined threshold is periodically received and updated by said judging means.

23. An apparatus according to claim 17, wherein said dropping means is a means implemented for traffic policing and/or congestion control.

24. An apparatus according to claim 17, wherein said dropping means comprises a drop control means for determining a congestion of a transmission link or an overuse of a contract of a transmission link, as said predetermined dropping condition, and for releasing a dropping operation, when the predetermined dropping condition has been determined.

25. An apparatus according to claim 16, wherein said telecommunication network is a mobile network and said packet transmission apparatus is a base station of said mobile network.

26. An apparatus according to claim 16, wherein said packet transmission apparatus is arranged to perform a downlink transmission.

27. An apparatus according to claim 26, wherein said telecommunication network is a mobile network and said packet transmission apparatus is a radio network controller of said mobile network.

28. A network element for a telecommunication network, comprising judging means for judging a quality of a received data packet based on an uplink quality parameter and/or a downlink power control status; dropping means for detecting dropping information included in said received data packet, and for dropping said data packet based on said detected dropping information, when the predetermined dropping condition is met, wherein said data packet is an ATM cell and defective data frames are packed into the same ATM cell, and wherein those ATM cells which contain only defective frames are tagged.

29. A network element according to claim 28, wherein said dropping means comprises a drop control means for determining a congestion of a transmission link and/or an overuse of a contract of said transmission link, as said dropping condition, and for releasing a dropping operation, when the dropping condition has been determined.

30. An apparatus according to claim 28, wherein said network element is an ATM node or an ATM gateway.

* * * * *